A. P. AND C. E. LINVILLE.
GREASE RETAINER.
APPLICATION FILED OCT. 22, 1919.
1,382,991. Patented June 28, 1921.
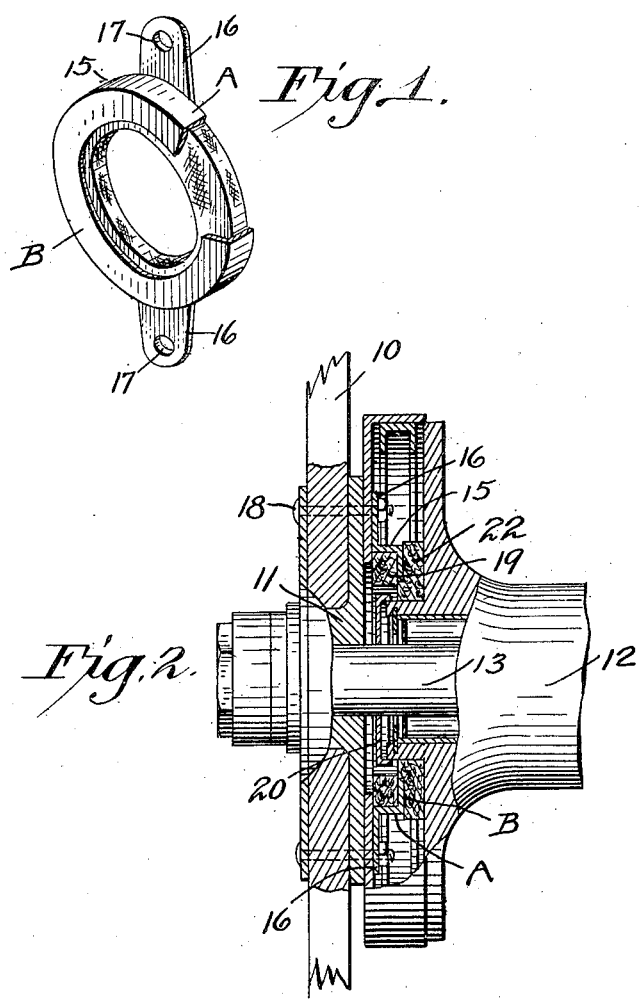

UNITED STATES PATENT OFFICE.

ARTHUR P. LINVILLE AND CLARENCE E. LINVILLE, OF BERKELEY, CALIFORNIA.

GREASE-RETAINER.

1,382,991.  Specification of Letters Patent.  Patented June 28, 1921.

Application filed October 22, 1919. Serial No. 332,409.

*To all whom it may concern:*

Be it known that we, ARTHUR P. LINVILLE and CLARENCE E. LINVILLE, both citizens of the United States, residing at Berkeley, in the county of Alameda and State of California, have invented new and useful Improvements in Grease-Retainers, of which the following is a specification.

This invention relates to an automobile accessory, and particularly pertains to a grease retainer.

During the performance of many automobiles, it happens that the oil and grease, which is contained within the rear axle housing, often leaks out around the end of the housing and damages the wheel as well as reaches the rubber of the tire and deteriorates it.

It is the principal object of the present invention, therefore, to provide a simple and convenient means, which may be easily attached to the wheel of a vehicle and surrounding axle in a manner to prevent the leaking of oils and grease into the brake drum.

The present invention contemplates the use of an annular washer, within which is carried a fibrous packing material adapted to circumscribe the axle housing of a vehicle and to absorb the oils and grease passing thereover.

The invention is illustrated by way of example in the accompanying drawings, in which—

Figure 1 is a view in perspective, showing the accessory with parts broken away to more clearly disclose the packing member.

Fig. 2 is a view in central, vertical section through the hub portion of a "Ford" rear wheel.

In the drawings, 10 indicates a vehicle wheel structure, having the usual spokes, which are mounted upon a hub casting 11. As more clearly shown in Fig. 3, the wheels are arranged at opposite ends of an axle housing 12, within which a live axle 13 is secured. The hub casting 11 also is mounted upon the live axle 13 and may rotate in relation to the axle housing 12 in a manner which will be readily understood. It will be evident that due to the communication between the axle housing, which is filled with grease, and the hub casting, there will be a tendency for the grease and oil to work its way out through the bearings of the live axle and the axle housing cap 20 and then radially between the latter and the hub 11 or out through the brake drum from which it is thrown outwardly by centrifugal action, to be deposited upon the spoke of the wheel 10 or the rubber of the tire casing. When the oil and grease is deposited upon the spoke, an undesirable condition will be the result, and when the oil reaches the rubber of the tire, the rubber will be deteriorated and the tire casing in the course of time rendered useless. To prevent this, a grease retainer is provided, the same comprising an angle-sectioned ring 15 having a cylindrical portion A and an end flange B. The cylindrical portion is provided with oppositely extending ears 16, through which openings 17 are provided for receiving certain of the bolts 18 of the wheel. Inclosed by the ring 15 is a packing washer 19. This washer is preferably formed of felt or other fabric and absorbent material.

The bolts 18 thus secure the inner packing 19 against the brake drum 21, while exterior of the ring 15 a thicker felt washer 22 is placed about the axle housing cap 20 which fills the space between said ring and the brake-supporting disk 23 of the axle housing. Upon replacing the wheel, the ring 15 will seat against and ride upon the outer packing 22 and thereby form a perfect seal between the axle and the outwardly arranged brakes. Consequently, any grease which leaks from the axle housing cap 20 will be confined to the inside of the retainer and hub and thereby kept from the brake drum. It will be noted that the packing 19 engages about the outer end of the cap 20 and will thus serve to retain the grease at the end of the cap.

It will thus be seen that the packing structure here disclosed may be applied at the outer end of the axle housing in a manner to prevent the flow of lubricant from the housing and on to parts which are to be maintained in a clean condition. At the same time permitting the lubricant to flow through the outer bearings of the axle housing for their lubrication.

While we have shown the preferred form of our invention, it will be understood that various changes might be made in the combination, construction and arrangement of parts by those skilled in the art, without departing from the spirit of the invention as claimed.

Having thus described our invention, what we claim and desire to secure by Letters Patent is—

1. In combination with a wheel, an axle housing, an axle, a brake drum, and a cup-shaped ring attached to the inside of the brake drum and surrounding the axle, and a packing washer arranged in the ring of a second packing washer between the closed end of the ring and the opposing end wall of the axle housing.

2. In combination with an axle, an axle housing, a wheel removably mounted on the axle and a brake drum carried by the wheel, and a packing washer, of a ring securing the washer directly against the drum, and a second packing means arranged beyond the ring for being impinged by the latter against the axle housing when the wheel is placed in position on the axle.

In testimony whereof we have hereunto set our hands in the presence of two subscribing witnesses.

ARTHUR P. LINVILLE.
CLARENCE E. LINVILLE.

Witnesses:
W. P. WOOLSEY,
R. G. RALSTON.